Nov. 29, 1927.
C. M. JAMIESON
1,651,350
BUFFING APPARATUS
Filed Feb. 14, 1922
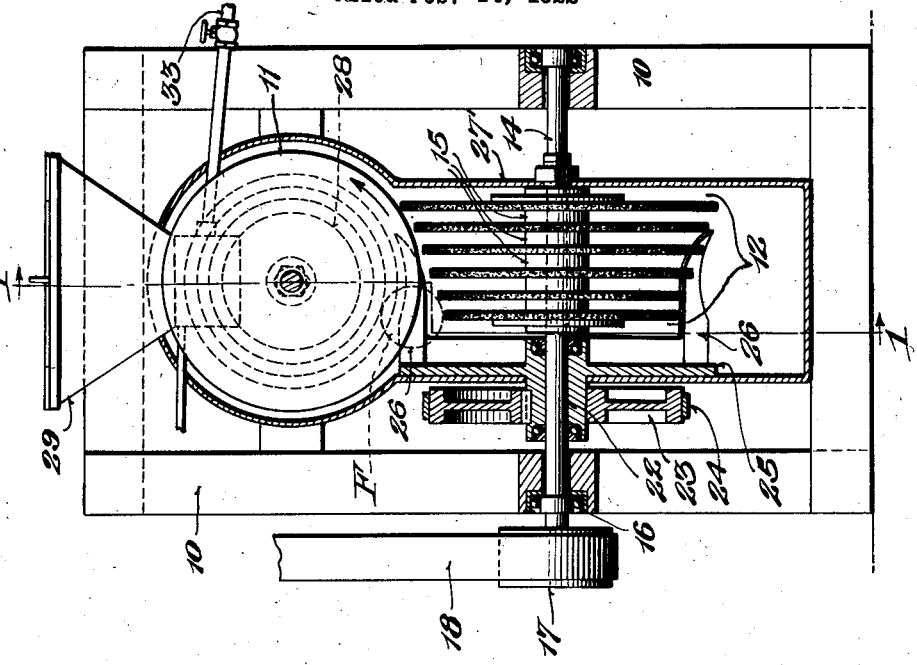
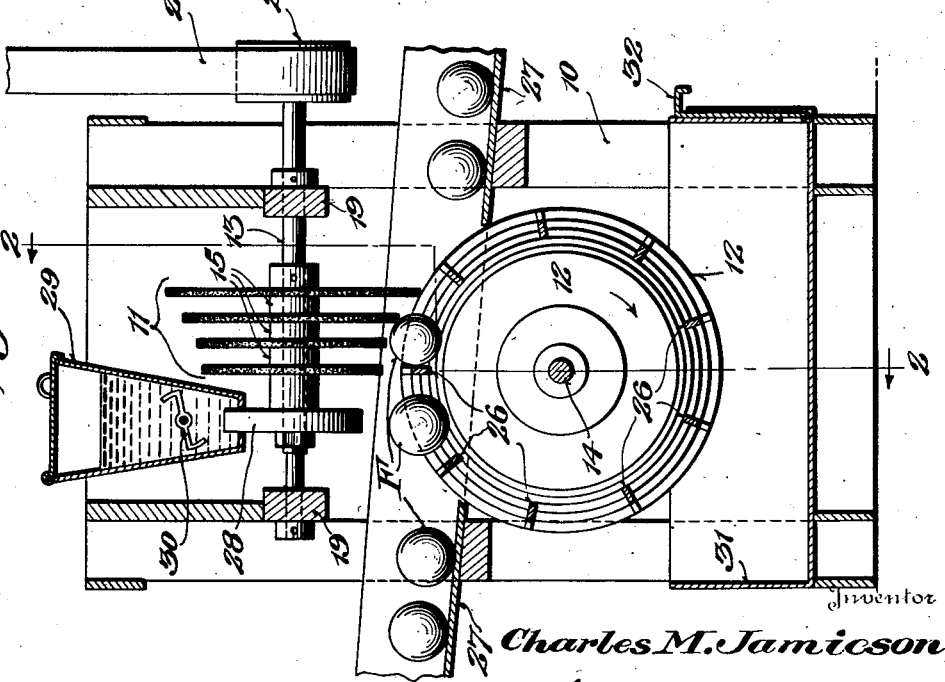
Witness:— Chas. L. Griestaner
Inventor
Charles M. Jamieson,
By Steward & McKay
his Attorneys Patented Nov. 29, 1927.

1,651,350

UNITED STATES PATENT OFFICE.

CHARLES MURDOCK JAMIESON, OF WINTER HAVEN, FLORIDA, ASSIGNOR, BY MESNE ASSIGNMENTS, TO BROGDEX COMPANY, OF WINTER HAVEN, FLORIDA, A CORPORATION OF FLORIDA.

BUFFING APPARATUS.

Application filed February 14, 1922. Serial No. 536,554.

This invention relates to buffing apparatus; and it relates more particularly to apparatus especially useful for preparing fresh fruit for market in a clean, sound and readily salable condition and so that it will reach the consumer in such condition. The apparatus of the invention is especially useful for the treatment of oranges, grapefruit, and other citrus fruits which, as is well known, must be handled, packed and shipped with great care if they are to reach the consumer in good condition.

In the customary preparation of such fruit for market as heretofore practiced, the freshly picked fruit first undergoes a thorough washing to cleanse its surface, generally by submergence in a vat of water and then by passing the fruit through a comparatively elaborate scrubbing apparatus where the fruit is subjected to the action of brushes in association with a water spray. After the cleansing operation the fruit is delivered to a drier where care is taken to evaporate off as much as possible of the surface moisture, this being important in order to avoid the development of mold or fungi discoloring the fruit or causing its decay. The fruit is next delivered to a rubbing or polishing apparatus, well known types of which comprise a series of parallel brush rolls which brush and polish the surface of the fruit as it is fed along the runways between these rolls.

One of the objects of my present invention is the provision of mechanically operating rubbing or polishing means in a comparatively small compact structure, which will perform the rubbing action upon the article to be buffed or polished in a minimum of time, and which will with greater certainty perform the rubbing action over the entire surface of the article.

Another object of my invention is the provision of mechanically operating rubbing means having such a buffing action that it may be used, particularly in the treatment of fruit and more especially citrus fruit, to thoroughly clean the surfaces of the fruit from all extraneous matter and optionally to permit dispensing with the customary washing and scrubbing operations hereinbefore referred to.

Still another object of my invention is the provision of mechanically operating means, and desirably in association with rubbing means in the same unitary compact structure, for applying to the fruit, after its surface has been cleansed, a coating material of such nature that by the rubbing action of the apparatus there is formed over each piece or article of fruit a thin continuous and smooth protective or preservative coating. It has been discovered that by properly applying to citrus fruit a mixture of a sealing and waterproofing material, such as paraffin, with a volatile liquid vehicle, such as gasolene, the fruit may be provided with a very thin but continuous coating that protects it from infection, prevents it from withering, and in general maintains its original appearance, soundness, freshness and flavor. The apparatus of the present invention, when employing the means for applying the coating material in association with the rubbing means, enables this treatment to be carried out in a simple, economical and effective manner.

In one of its broad aspects the novel apparatus comprises buffing devices arranged and mounted to provide within small compass an extended buffing pathway or passage through which the articles may be fed, and means for positively feeding or impelling the articles along the pathway or passage at a controllable rate. The term "buffing" is employed herein broadly to signify not merely buffing in a limited sense, but rubbing, brushing, or other analogous frictional action.

Because of the particular applicability of the novel apparatus to the treatment of citrus and other globular fruits, reference will be made in explaining its principles, to a concrete illustrative embodiment particularly useful in treating such fruit. It is to be understood, however, that the novel apparatus in certain forms may be used for other purposes, and that the embodiment hereinafter described is merely illustrative of the broad principles involved, and that the broad scope of the invention includes various other specific constructions capable of functioning in accordance with said principles.

A typical embodiment offering important practical advantages particularly for treating citrus fruits and the like is illustrated more or less diagrammatically in the accompanying drawings, wherein:

Figure 1 is a vertical sectional view along the line 1—1 of Fig. 2; and

Fig. 2 is a vertical sectional view along the line 2—2 of Fig. 1, of one form the novel apparatus may take.

In the particular embodiment of the apparatus illustrated in the drawings, which includes composition-applying means, rubbing or buffing devices, means for feeding the fruit through the region of the rubbing or buffing action, and means for applying a coating material to the fruit, all take the form of rotary devices compactly mounted within a single frame 10, rectangular in general contour and supporting the necessary driving mechanism.

In the present illustrative embodiment of the novel apparatus, the buffing devices or units are two in number and take the form of two sets or series 11 and 12 of annular disks cooperatively mounted to provide a buffing pathway or passage for the fruit. Various cooperative arrangements of the two series of disks comprising the buffing devices to provide the pathway or passage referred to may be made; but in the illustrative example, they are mounted, respectively, upon separately rotatable spindles 13 and 14, disposed one above the other and at right angles.

The component disks of the buffing units 11 and 12 may be of any suitable material providing the proper rubbing action upon the article to be treated. In the present illustrative apparatus, designed particularly for the treatment of citrus fruit, said disks are made flexible and desirably of a fabric material, preferably woven or felted, and are spaced apart by collars or spacers 15 upon their respective spindles, which spacing permits a comparatively extensive degree of flexure of their edge portions, the advantages of which flexibility, particularly in regard to the upper series of disks, will more fully appear hereinafter. Each disk may consist of one ply or a plurality of plies of the buffing material employed.

The disks of the upper buffing device 11 are so graduated in diameter that the peripheral surface of said buffing device, or in other words its surface of revolution, is what may be termed generally conoidal in contour. The series of disks comprising the lower buffing device 12, the planes of which disks, as they are mounted in the illustrative example, extend at right angles to the planes of the disks of the buffing device 11, are also graduated in diameter to give the peripheral surface or surface of revolution of the buffing device 12 a generally conoidal form. These conoidal surfaces of revolution are concave in the form of the novel apparatus illustrated in the drawings. It will be seen also that the buffing passage included between said surfaces has its greatest fruit-receiving width, or radial extent in this instance, at the left as viewed in Fig. 2; and that it narrows toward the right, that is, transversely to the general direction in which the fruit travels through the machine. In the arrangement shown, said fruit-receiving width or radial extent of the buffing passage also narrows in such general direction of travel of the fruit, as is seen most clearly in Fig. 1.

The spindle 14 of the lower series is mounted in bearings 16 in the frame 10 as shown, and is driven by a pulley 17 and belt 18. The spindle 13 of the upper series of disks is likewise mounted in bearings 19 in the frame 10 and driven by a pulley 20 and belt 21.

In the present instance, in the illustrative form of the apparatus, the means for impelling or feeding the fruit through the buffing pathway or passage takes the form of a rotating carrier or impeller device having a hub 22 mounted for independent rotation upon the spindle 14 and driven by a pulley 23 and belt 24. The hub 22 carries a disk or spider 25, to which impeller blades or pushers 26 are secured in spaced circular arrangement and project laterally therefrom into and transversely across the buffing pathway or passage between the juxtaposed peripheral surfaces of the buffing devices 11 and 12. The impeller blades may extend in planes substantially radial to the axis upon which they are mounted and have upwardly curved end portions decreasing in width, so that the impeller blades conform in general contour to the cross section of the buffing passage, but are out of contact with and can move freely between the peripheral surfaces bounding said passage, as shown in Fig. 2.

Means are provided for directing fruit into the buffing passage and for receiving buffed fruit discharged therefrom. To this end, in the present example, a chute 27 extends at an inclination across the frame 10, below and substantially parallel to the axis of buffing device 11, and above and substantially at right angles to the axis of the lower buffing device 12. The bottom of this chute has a cut out portion through which the lower buffing device and the impeller device 25—26 project upwardly into the path of the fruit delivered to the buffing passage, the lower disks extending as a series transversely of the chute.

The chute 27 has two portions, one functioning as a feed chute to feed the fruit to the buffing devices, and the other functioning as a discharge chute to discharge or deliver the fruit from the buffing devices. As viewed in Fig. 1, the feed portion of the chute is shown to the left of the buffing devices and the discharge portion to the right. The feed portion is of such a width as to feed the pieces of fruit in single file and so positioned as to deliver them in succession to the buffing passage at its greatest fruit receiving width, or radial extent in the present instance, which is on the left hand side as viewed in Fig. 2, the position of a piece of fruit being indicated at F in dotted lines. The discharge chute is of a width to permit the direct discharge thereinto of fruit from any of the various positions at the exit end of the buffing passage which the fruit may have attained in its course of travel through that passage. In the present instance, in the illustrative form of the apparatus, the discharge chute may be as wide as that portion of the casing 27' encompassing the lower buffing device and the rotary carrier or impeller device.

The carrier or impeller device is rotated in a direction to advance the impeller blades in succession in the upper portions of their path of revolution through the pathway or passage between the two buffing devices, that direction in the present specific instance being the clockwise direction of rotation indicated by the arrow in Fig. 1. An article or piece of fruit, having been fed to a position against the peripheral surfaces of the lower disks, is engaged by the next advancing impeller blade or pusher 26, and impelled thereby in a positive feeding movement of translation into and through the passage between the two series of disks, the piece of fruit being in the meantime bodily supported upon the peripheral surfaces of the lower series of disks as upon a floor.

The rotary carrier or impeller device may have as many impeller blades spaced thereon, the number depending upon the diameter of the device, as can effectively operate in feeding the pieces of fruit in succession through the region of buffing action, and permit a free rolling movement between two adjacent impeller blades and in varying directions along the peripheral surfaces of the buffing disks in the manner hereinafter referred to. In the illustrative form of the apparatus, nine such impeller blades are shown spaced apart to provide nine pockets for the fruit advancing through the region of the buffing action.

The three rotating devices heretofore referred to, namely the upper and lower buffing devices and the carrier or impeller device for feeding the fruit through the region of the buffing action, are advantageously driven at differing speeds. For instance, an impeller having nine pockets, as in the present instance, may be driven at say sixty revolutions per minute, which produces a feeding movement of five hundred and forty pieces of fruit per minute. The upper buffing device is rotated in a direction to cause its peripheral surface in its lower path of revolution to advance across the juxtaposed peripheral surface of the lower buffing device in a direction from the smallest toward the largest disk of that lower buffing device as indicated by the arrow in Fig. 2, and hence in a direction to cause the fruit between the impeller blades to move longitudinally of those blades and transversely to the peripheral surface of the lower buffing device, that is, transversely to the general direction of fruit travel through the buffing passage. Since the fruit is positively moved by the impeller blades through the region of the buffing action, the lower buffing device need not be rotated in the direction of feeding movement of the fruit, although it may advantageously be so rotated, as indicated by the arrow in Fig. 1. The buffing devices may advantageously be driven at substantially greater mean surface or linear speeds than the impeller device, and the lower buffing device at a substantially greater speed than the upper. The lower buffing device is preferably driven at such a relatively high rate of speed that the centrifugal force substantially stiffens its component disks, especially those of larger diameter, thus rendering the surface of said device when in operation relatively non-yielding or rigid and providing a supporting and reactance surface for the fruit advanced thereon and presented to the buffing action of the upper buffing device. The upper buffing device, on the other hand, is preferably driven at such a low rate of speed, relative to that of the lower buff, as to afford a degree of flexibility of its component disks in their rubbing engagement with the fruit. This flexibility permits a bending or flexing of the edge portions of the upper disks in their engagement with the fruit and hence the presentation of side portions as well as peripheral edges of these disks into rubbing engagement with the fruit, thus increasing the area of rubbing contact with the fruit, and providing a particularly effective rubbing or buffing action. While the optimum means velocities of the buffing surfaces will differ to a considerable extent under practical operating conditions, a mean surface velocity of the order of say 5000 to 6500 feet per minute for the lower buff 12, and of say 1000 feet per minute for the upper buff, may be mentioned to give an idea of the relation between the mean surface velocities of the two buffs in a typical instance.

As heretofore stated, the buffing passage for the fruit decreases in cross-sectional area in the direction of the increasing circumferences of the generally conoidal surfaces of the two buffing devices, and the upper buffing device is rotated in a direction tending to impel the fruit along the passage in the direction of its decreasing cross-sectional area. This arrangement therefore provides for increasing flexures of the component disks of the upper buff as the fruit is thus impelled, and also for the accommodation, in rubbing contact with the generally conoidal surfaces of the two buffing devices, of pieces of fruit of varying sizes which, because of their varying sizes, travel in varying paths along the conoidal surfaces referred to.

As heretofore stated, the pieces of fruit enter the pockets between the carrier or impeller blades singly, one for each pocket, and are advanced by the impeller blades through the region of the buffing action, the spacing of the impeller blades permitting during that advance a rolling movement of the pieces of fruit in all directions along the generally conoidal peripheral surfaces of the upper and lower buffing devices. Each piece of fruit thus advanced by the impeller blades is engaged in a rubbing action by the peripheral surfaces, and in flexure by side portions of the disks of the upper buffing device; and because of the direction of rotation of those disks, a rotative movement is imparted to the fruit tending to impel it transversely of the peripheral surface of the lower buffing device. At the same time the lower buffing device in rapid rotation in supporting and rubbing engagement with each piece of fruit tends to impart rolling movement to the fruit along, instead of transversely of, the peripheral surface edges of its component disks and hence in a different direction from the motion-imparting action of the upper buffing device. In addition, the impeller or carrier blades, by engagement of the fruit therewith, are constantly varying the directions of rolling movements imparted to the fruit, the resultant effect being to produce rolling movements of the fruit in the buffing passage about constantly varying axes of the fruit which present the entire surface of the fruit to the rubbing or buffing action of the buffing devices.

A coating material may be applied to the fruit for the purpose heretofore stated and when such a material is applied the novel rubbing devices described are particularly effective in forming from that coating material initially applied to the fruit, a thin, smooth coating over its entire surface. My invention contemplates means in association with the rubbing devices for applying such coating material. In the illustrative form of the apparatus shown in the drawings, the applying device takes the form of a rotary wheel or disk 28 formed of suitable material or having a surface of suitable material to receive an application of the coating material and to discharge the same upon the fruit in its advance to the rubbing mechanism.

Said disk may be made of felt or a plurality of plies of woven fabric, for example. Advantageously, the wheel 28 may be mounted, and is so shown in the present instance, upon the spindle 13 to be driven by the driving means employed for the rubbing device 11. A suitable means for supplying the coating material to the rotary applying device 28 is provided, in the present instance by a container 29 mounted in the frame of the apparatus above the wheel 28 and having a lower portion encompassing the upper path of travel of the applying wheel so that the peripheral surface of the wheel is in contact with the coating material. The coating material may be of a fluid, semi-fluid or pasty consistency; and in a typical instance involving the treatment of citrus fruit, the coating material is a suitable mixture of paraffin and gasolene. The supply of coating mixture to the wheel 28 may be controlled by means of the adjustable valve device 30, provided in the lower portion or neck of the container.

The applying wheel is mounted in the line of the feeding movement of the fruit to the region of the buffing action, and may be arranged to discharge its load of the coating material to the advancing fruit either by contact of the fruit with the periphery of the wheel or by projection of the coating material from the wheel due to the centrifugal force set up by its rotation, depending upon the size of the fruit.

A pan 31 may be supplied slidingly mounted in the frame 10 below the lower buffing device to catch thrown-off coating-material. The pan is supplied with a handle 32 for convenience in removing the pan to dispose of the coating-material collected therein.

A valve controlled drain pipe 33 is provided to drain off the fluent coating material when it is desired to empty the container 29.

The novel apparatus as a single unit may be employed as already described with or without the composition-applier 28, as a buffing apparatus to treat fruit previously washed and dried in the usual manner. Omitting the composition-applier it may also be employed to dry-clean fruit in the first instance, thus dispensing with the usual washing operations and saving the large floor space required in the customary packing house installations for vats and washing apparatus. Fruit cleaned in this first unit may be delivered to a second, equipped with a composition-applier, to be protectively coated and polished as already described. Two or more units of the novel type herein disclosed may thus be advantageously employed in series in the manner stated, or otherwise.

In the specific form of apparatus illustrated in the drawings, the cooperating buffing devices are shown as on different axes, but such arrangement is not an essential feature of the invention in its broader aspects.

What I claim is:

1. Buffing apparatus comprising, in combination, two rotary buffing devices, cooperating to provide a buffing passage through which articles may be fed, rotary feeding means mounted coaxially with at least one of said devices and extending into said passage, and means for driving said buffing devices and feeding means.

2. Buffing apparatus comprising, in combination, buffing members having buffing surfaces arranged to move in predetermined paths, and cooperating to provide a buffing passage having an effective width that narrows transversely toward one side, the movement of the buffing members being such as to direct articles being buffed toward the narrower side, feeding means operable to advance articles through said buffing passage and govern the extent of their contact with the buffing surfaces thereof while permitting movement transversely of said passage, and means for moving said buffing members at requisite velocity and actuating said feeding means.

3. Buffing apparatus comprising, in combination, two rotary buffing devices angularly disposed with respect to each other and cooperating to provide a buffing passage through which articles may be fed, rotary feeding means mounted coaxially with one of said devices and extending into said passage transversely of and closely adjacent the buffing surfaces of such coaxial buffing device, said feeding means being capable of rotational movement independently of said buffing devices, and means for driving said buffing devices and feeding means.

4. Buffing apparatus comprising, in combition, two rotary buffing devices angularly disposed with respect to each other and cooperating to provide a buffing passage through which articles may be fed, the contour and disposition of the cooperating buffing surfaces being such that said passage narrows toward one side, rotary feeding means mounted coaxially with one of said devices and extending into said passage transversely of and closely adjacent the buffing surface of such coaxial buffing device, said feeding means being capable of rotational movement independently of said buffing devices, and means for driving said buffing devices and feeding means, the buffing device that is non-coaxial with the said feeding means being driven in such direction as to impel toward the narrower side of said passage articles fed therethrough.

5. Buffing apparatus comprising, in combination, two rotary buffing devices having generally conoidal surfaces of revolution and mounted operatively adjacent with their rotation axes substantially at right angles to each other, the buffing surfaces of said devices cooperating to provide a buffing passage narrowing transversely from a maximum width along one side toward the opposite side, feeding means operable to advance articles through said passage at a predetermined rate of speed while permitting movement of such articles transversely of said passage, and means for driving said buffing devices and feeding means, one of said buffing devices being rotated in a direction tending to impart transverse movement of said articles toward the narrower side of said passage.

6. Fruit treating apparatus comprising, in combination, rotary buffing devices mounted to provide a buffing passage through which fruit may be fed, feeding means including impeller or pusher members projecting into and movable in said passage, and means for driving said buffing devices and said feeding means.

7. Fruit treating apparatus comprising, in combination, rotary buffing devices angularly mounted to provide a buffing passage narrowing transversely toward one side, feeding means movable in said passage and relatively to the buffing surfaces thereof, and means for driving said buffing devices and said feeding means, the latter at a lower rate of speed than the buffing surfaces, the driving of said buffing devices being such as to direct the fruit toward the narrow side of said passage.

8. Fruit treating apparatus comprising, in combination, a series of flexible disks of a material suitable for rubbing the surface of the fruit, means mounting said disks in spaced relation upon a common axis, and means for driving said series of disks in rotative movement, means for feeding fruit past said disks in a path across their peripheral surfaces and through positions flexing the planes of said disks.

9. Fruit treating apparatus comprising, in combination, two series of rotating buffing disks, the disks of each series arranged upon a common axis, with the disks of each series graduated in diameter complementary to the disks of the other series together to provide a pathway for the fruit in simultaneous engagement with peripheral surfaces in the two series of disks, means for feeding the fruit to said pathway and means for rotating one series of disks at a different speed from the other series.

10. Fruit treating apparatus comprising, in combination, two rubbing devices, each device comprising a plurality of spaced disks upon a common axis, said axes disposed to support the disks of one device in planes at an angle to the disks of the other device and to space apart the peripheral surfaces of the disks of said devices, thereby providing a pathway for the fruit between and in simultaneous contacting relation with the peripheral surfaces of said devices, means for advancing the fruit through said pathway along the peripheral surface of one of said devices, and means for rotating said devices.

11. Fruit treating apparatus comprising, in combination, two rotatable buffing devices composed of flexible disks, the disks of both devices being arranged in spaced relation upon a common axis and graduated in diameter to a similar extent, the axes of said devices being disposed in spaced relation at right angles to provide a pathway for the fruit in simultaneous engagement with peripheral surfaces of both devices, means for feeding the fruit to said pathway, a series of spaced impeller blades mounted upon the axis of one of said buffing devices and arranged to project across the peripheral surface thereof, and means for driving said buffing devices at different speeds, means for driving said impeller blades at a slower speed than said buffing devices, and means for receiving fruit discharged from said pathway.

12. Fruit treating apparatus comprising, in combination, means for feeding fruit in a predetermined path, a flexible buffing disk mounted for rotation upon an axis positioned adjacent said path to extend an edge portion of said disk into said path, means for applying a coating material to said fruit in the advancing movement to said buffing disk, and means for rotating said disk.

13. Fruit treating apparatus comprising, in combination, a series of flexible disks of a material suitable for rubbing the surface of the fruit, means mounting said disks in spaced relation upon a common axis, and means for driving said disks in rotative movement, means for initially applying a coating material to the fruit and means for feeding said fruit past said disks in a path across their peripheral surfaces and through positions flexing the planes of said disks.

14. Apparatus for coating globular articles, comprising, in combination, rubbing means and means to feed the fruit in a predetermined path to said rubbing means, a rotary coating-material applying device, and means for supplying coating-material thereto, said applying device being adapted to be rotated at high speed to project said coating material therefrom by centrifugal force into said path of said fruit, and means for driving said applying device at said speed.

15. Fruit treating apparatus comprising, in combination, two series of rotating buffing disks, the disks of each series arranged in spaced relation upon a common axis, with the two series of disks disposed relative to each other to provide complementary rubbing surfaces, permitting simultaneous engagement of the fruit with a rubbing surface of a disk of each series, means for feeding the fruit to said rubbing surfaces, rotary coating-material applying means mounted upon the axis of one of said series of disks and operative to apply coating material to said fruit and means for driving the disks of the two series in different directions of rubbing engagement with the fruit.

16. Fruit treating apparatus comprising, in combination, rubbing elements, including a rotary rubbing element, cooperating to provide a runway for fruit to be treated, means operable to supply coating material to fruit passing through the runway, and impelling means operable to positively advance fruit through said runway, said impelling means comprising a series of spaced pusher members projecting into and movable through said runway.

17. Fruit treating apparatus comprising, in combination, rubbing elements, including a rotary rubbing element, cooperating to provide a runway for fruit to be treated, and impelling means operable to positively advance fruit through said runway, said impelling means comprising a series of spaced pusher members projecting into and movable through said runway.

18. Fruit treating apparatus comprising, in combination, rotary buffing means, movable controlling means acting positively on fruit to govern the length of time which the fruit remains in contact with said buffing means, and driving means for actuating said buffing means and controlling means.

In testimony whereof I hereunto affix my signature.

CHARLES MURDOCK JAMIESON.